US008495703B2

(12) United States Patent
King et al.

(10) Patent No.: US 8,495,703 B2
(45) Date of Patent: Jul. 23, 2013

(54) SECURITY POLICY VERIFICATION SYSTEM (75) Inventors: Nigel King, San Mateo, CA (US); Nigel David Smith, Redwood City, CA (US); Rajesh Chandra Singh, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 762 days.

(21) Appl. No.: 12/487,361

(22) Filed: Jun. 18, 2009

(65) Prior Publication Data

US 2010/0325569 A1 Dec. 23, 2010

(51) Int. Cl.
*G06F 7/04* (2006.01)
(52) U.S. Cl.
USPC .......................................................... 726/1
(58) Field of Classification Search
USPC .......................................................... 715/711
See application file for complete search history.

(56) References Cited

U.S. PATENT DOCUMENTS

| | | | |
|---|---|---|---|
| 5,720,001 A * | 2/1998 | Nguyen | 706/59 |
| 5,895,464 A * | 4/1999 | Bhandari et al. | 704/9 |
| 6,088,679 A | 7/2000 | Barkley | |
| 6,484,261 B1 | 11/2002 | Wiegel | |
| 7,363,650 B2 | 4/2008 | Moriconi et al. | |
| 7,543,015 B2 * | 6/2009 | Vion-Dury et al. | 709/200 |
| 7,945,691 B2 * | 5/2011 | Dharamshi | 709/232 |
| 2004/0162906 A1 | 8/2004 | Griffin et al. | |
| 2004/0260818 A1 * | 12/2004 | Valois et al. | 709/229 |
| 2008/0307388 A1 * | 12/2008 | Ralls et al. | 717/115 |
| 2009/0099860 A1 * | 4/2009 | Karabulut et al. | 705/1 |
| 2011/0302563 A1 * | 12/2011 | Li | 717/143 |

OTHER PUBLICATIONS

David F. Ferraiolo et al.; "Role-Based Access Controls"; National Institute of Standards and Technology; Technology Administration; U.S. Department of Commerce; Gaithersburg, MD 20899 USA; 15th National Computer Security Conference (1992); Baltimore; Oct. 13-16, 1992; pp. 554-563.

* cited by examiner

*Primary Examiner* — Kambiz Zand
*Assistant Examiner* — Abiy Getachew
(74) *Attorney, Agent, or Firm* — Miles & Stockbridge P.C.

(57) ABSTRACT

Systems and methods are provided that comprise a security policy verification system for verifying security policies. The system parses programming language code that implements security policies, and identifies annotations in the programming language code. The system then matches the annotations to the security policies to which the annotations correspond. The system then displays a natural language description of the security policy in a user interface.

18 Claims, 5 Drawing Sheets

SECURITY POLICY VERIFICATION SYSTEM

FIELD OF THE INVENTION

One embodiment is directed generally to computer systems, and more particularly to security policy implementation verification for roles.

BACKGROUND INFORMATION

In typical role-based access control ("RBAC") systems, access to an object within a computer system is provided to the members of groups termed "roles." Subjects belonging to a given role have the same privileges to access various objects within the system. Individuals are then granted access to objects by being assigned membership in appropriate roles. RBAC is considered useful in many commercial environments because it allows access to the computer system to be conveniently organized along lines corresponding to the actual duties and responsibilities of individuals within organizations. For example, RBAC allows the access provided by roles to conform to a preexisting hierarchy. In a hospital environment, members of the "doctor" role will have broader access to protected objects than would members of "nurse", who will in turn be given broader access than "health-care provider". Various types of privilege can be conveniently organized as a function of role assignments. For example, "doctor" membership may allow the user the privilege to read from or write to a pharmacy record, while "pharmacist" may only allow the privilege of reading the record.

Security policies define the privileges that are assigned to various roles. In a conventional system, these security policies are written by security professionals. Often, they are written without any traceability to the applications that are required to respect them. Thus, an audit of those security policies requires that the auditor have all the skills required to both construct and audit the application policies, identify applications that give access to information resources, find an owner of those resources, examine the resource owners for a statement of policy, and then attempt to either test whether the policy is implemented or review the actual code. In other words, there is no standard method for authoring, auditing, and editing security policies that does not require an intimate knowledge of the implementations of those security policies.

SUMMARY OF THE INVENTION

One embodiment is a security policy verification system for verifying security policies. The system parses programming language code that implements security policies, and identifies annotations in the programming language code. The system then matches the annotations to the security policies to which the annotations correspond. The system can then display a natural language description of the security policy in a user interface.

DETAILED DESCRIPTION

One embodiment is directed to a security policy verification system that provides a user interface allowing a security policy to be documented in plain, readable language (i.e., not code), and the various implementations of that security policy to be identified and verified. The security policy verification system identifies a policy and recognizes multiple implementations of that policy in each of the technologies that must secure the data. The security policy verification system includes a naming convention of the policies in an enterprise application and an annotation standard within the code itself. This annotation standard enables the security policy verification system to parse the coded implementations and determine whether the policy has been implemented. The security policy verification system also includes repository of the policies and each of their implementations. This repository may be recorded centrally or distributed over several servers.

Figure 1:
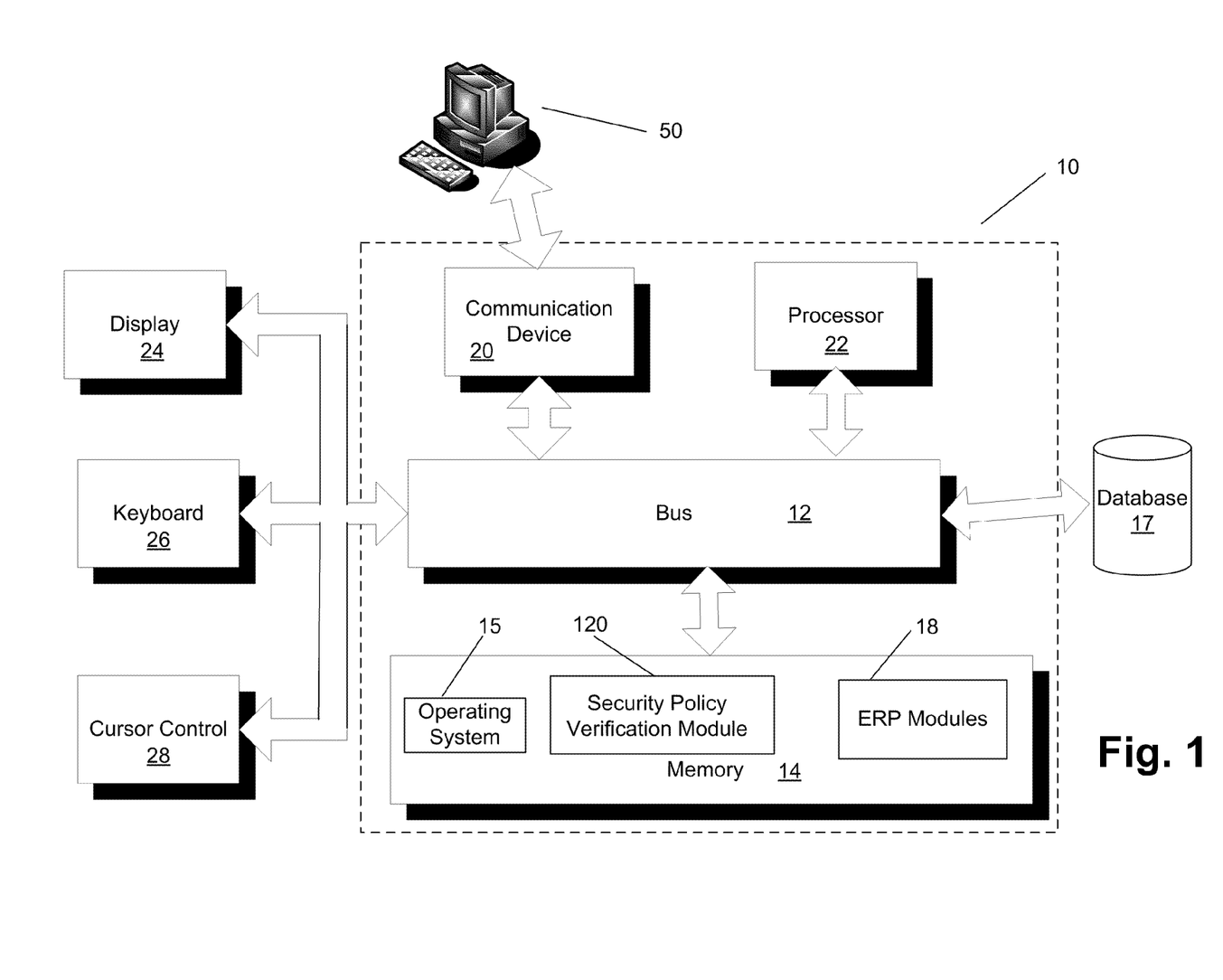
FIG. 1 is a block diagram of a security policy verification system in accordance with an embodiment.

FIG. 1 is a block diagram of a system 10 that can implement an embodiment of a security policy verification system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network (such as the Internet) or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a security policy verification module 120. This module is described in greater detail below. The modules may further include enterprise resource planning ("ERP") modules 18 of an ERP system that may interact with security policy verification module 120. An ERP system is a computer system that integrates several data sources and processes of an organization into a unified system. A typical ERP system uses multiple components of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, security policy verification module 120 may be a stand-alone system and not integrated with an ERP system, or may be part of any other integrated system. In some embodiments, the functions of security policy verification module 120, described below, are directed and utilized remotely from a user's computer 50 through communication device 20.

Figure 2:
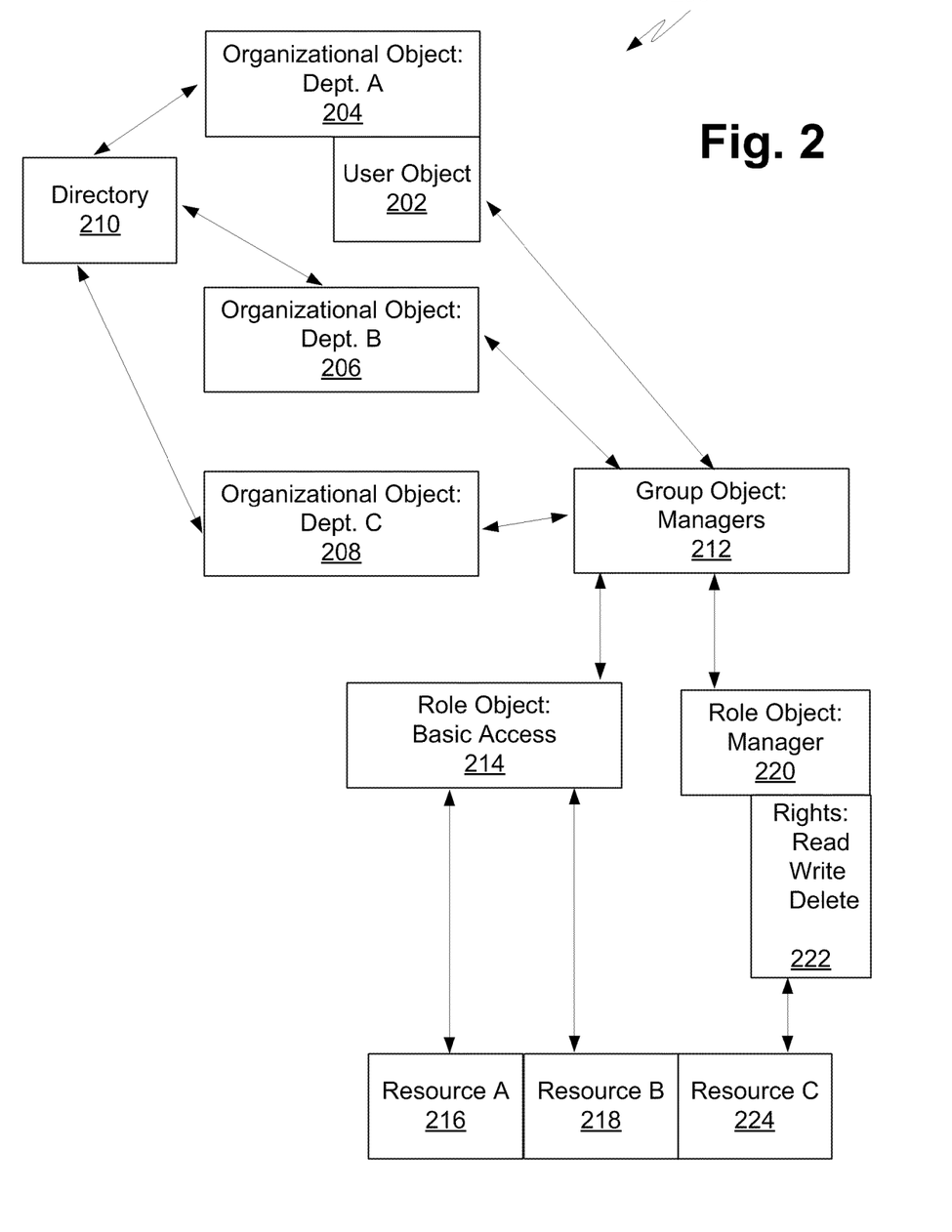
FIG. 2 is an example role-based access control system in accordance with an embodiment.

FIG. 2 is a block diagram of a typical role-based access control system. The elements shown within security management system 200 merely represent some of the general concepts, objects, relationships, or associations within a role-based access control system. Depending on the implementation of the security management system, the objects and relationships may have different names and functions.

Within an enterprise, an employee may "belong" to one or more organizational units, such as a department and a project. User object 202, which represents an employee, is associated with organizational object 204. Organizational objects 204, 206, 208 represent multiple organizational units within an enterprise, and each organizational unit is assumed to have multiple employees or users. Information about those employees are stored within corporate directory 210, which may be implemented as a data directory supported by one or more directory services.

User object 202 represents not only an employee but also a manager, so user object 202 is associated with group object 212, which represents a group of similar managers. In FIG. 2, organizational unit objects 206 and 208 are shown as being associated with group object 212. It may be assumed that each organizational unit within the enterprise has a manager of the type represented by group object 212, although the specific employees within the organizations represented by objects 206 and 208 are not specifically identified in the diagram.

Depending on an employee's title or job description within the enterprise, an employee may be assigned one or more roles within the security management/administration system. Group object 212 is associated with role object 214, which defines a role having basic access rights to resources 216 and 218. For example, each employee of the enterprise may have access to certain types of basic computational resources, such as an intranet account for accessing an internal, enterprise-wide, Web site. This basic access is also applicable to each manager associated with group object 212, so group object 212 has been associated with role object 214. Resource 216 might represent authorization to access a particular internal Web server, while resource 218 might represent authorization to access a firewall to the Internet.

However, each manager within the organization might require special privileges for accessing an invoice management application. In order to reflect actual business processes, role object 220 is defined and associated with group object 212, and role object 220 has a set of access rights 222 that determine exactly how any user associated with role object 220 can use resource 224, which might represent the invoice management application. The invoice management application may be used by different types of employees within the enterprise who have different authorized uses of the invoice management application. For example, a clerical employee may be allowed to view a purchase order in the invoice management application, but not to approve it, while a manager role would have permission to approve the purchase order.

In one embodiment, a security manager is able to confirm a security policy with a business user in a language that is direct and testable, but does not require knowledge of the underlying implementation technology of that security policy. For example, a security manager may review security policies with a payables manager and determine that an appropriate security policy for that role is: "Payable Clerk should be able to see invoices processed through the business unit in which they work." This natural language expressed policy may be implemented in many different "technologies" (e.g., computer languages, platforms, frameworks, etc.). For example, some Oracle Fusion applications may have transactional user interfaces built in a technology called Applications Development Framework ("ADF"), using standard Java Platform Security. Other Oracle Fusion applications may also use technologies such as Oracle Enterprise Grants, Oracle Business Intelligence Enterprise Edition, Oracle Secure Enterprise Search, and Oracle Essbase. In this example, each of these technologies will implement their own version of a security policy that reflects and implements the natural language statement "Payables Clerks should be able to see invoices processed through the business unit in which they work."

For example, some of the implemented security polices may include: checking for authorizations in an application's online transaction processing database, checking for authorizations in a Java class that may connect to an application's online transaction processing database through various protocols such as Open Database Connectivity ("ODBC") or Java Database Connectivity ("JDBC"), creating filters to be applied within a data warehouse, etc.

In one embodiment, a security policy may be written against an object such as "accounts payable invoices". However, the details of accounts payables invoices may be transformed to give other information such as how much can be spent for each supplier. The policy that an "Accounts Payable Manager should be able to see Accounts Payable Invoices in Business Units to which it is authorized" should apply to the transformation of the data from Accounts Payable Invoices to the spend fact. In one embodiment, the security policy verification system allows a user to see transformations of the data into different data stores, as well as different technologies accessing the same data store.

Figure 3:
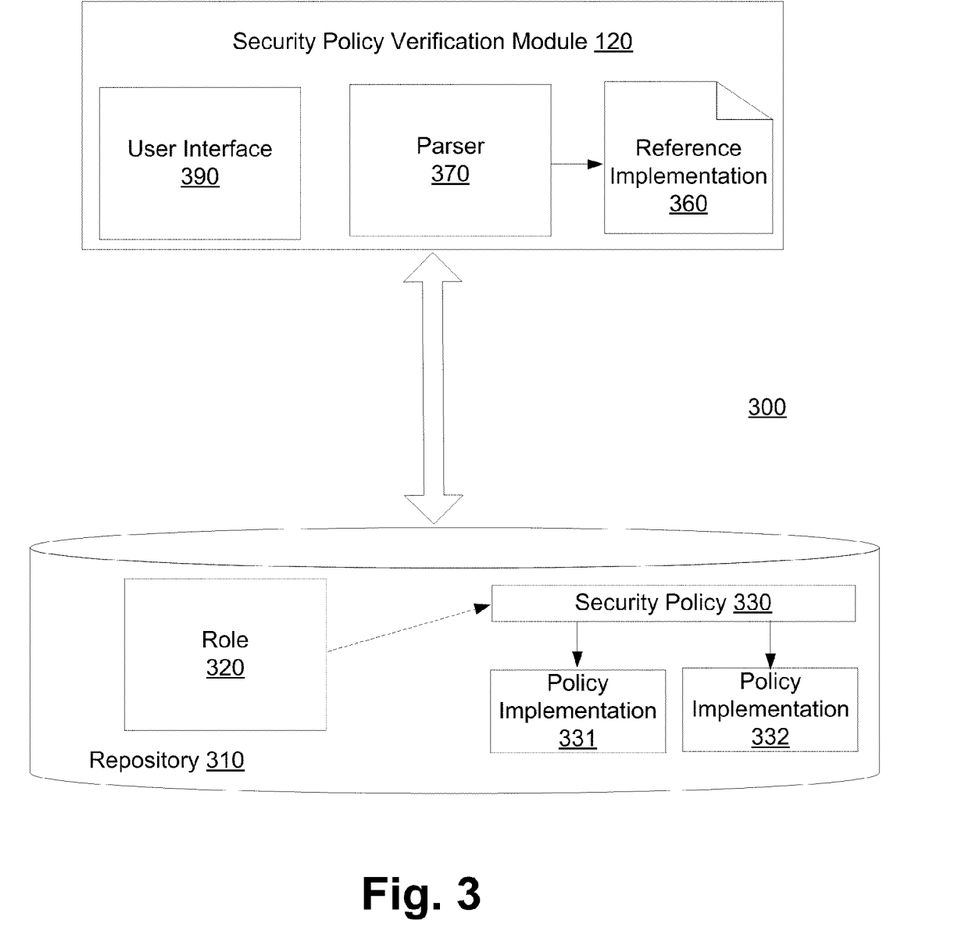
FIG. 3 is a logical diagram of a security policy verification system in accordance with an embodiment.

FIG. 3 illustrates a logical diagram of a security policy verification system 300 that provides multi-implementation verification of security policies in accordance with an embodiment. Security policy verification system 300 includes a repository 310 including a role 320 having an associated security policy 330. Security policy 330 has multiple implementations to implement security policy 330 in different technologies, for example, policy implementations 331 and 332. In one embodiment, policy implementation 331 implements security policy 330 in a first technology, for example, Oracle Enterprise Grants, and policy implementation 332 implements (i.e., reflected in software code) security policy 330 in a second technology, for example, Oracle Business Intelligence Enterprise Edition. One of ordinary skill in the art will recognize that a security policy 330 may have an unlimited number of implementations, that a role 320 may be associated with an unlimited number of security polices, and that repository 310 may include an unlimited number of roles. In one embodiment, repository 310 is embodied in database 17 of FIG. 1.

Security policy verification system 300 further includes security policy verification module 120, as first disclosed in connection with FIG. 1. Security policy verification module 120 provides a user interface (described below) for verifying roles and security policies (e.g., role 320 and security policy 330) in accordance with a reference implementation 360. Reference implementation 360 is a structure of the annotations/tags for describing role and policy implementations (e.g., policy implementations 331 and 332). Application developers implement their security policies in accordance with the technology in which they are working and include the reference annotations/tags, and upload those implementations to repository 310. Security policy verification module 120 includes a parser 370 to parse the policy implementation (e.g., policy implementations 331 and 332) to recognize the annotations and determine what policy is being implemented. Security policy verification module 120 further includes a user interface 390, described below, for displaying natural language descriptions of policy implementations.

Figure 4:
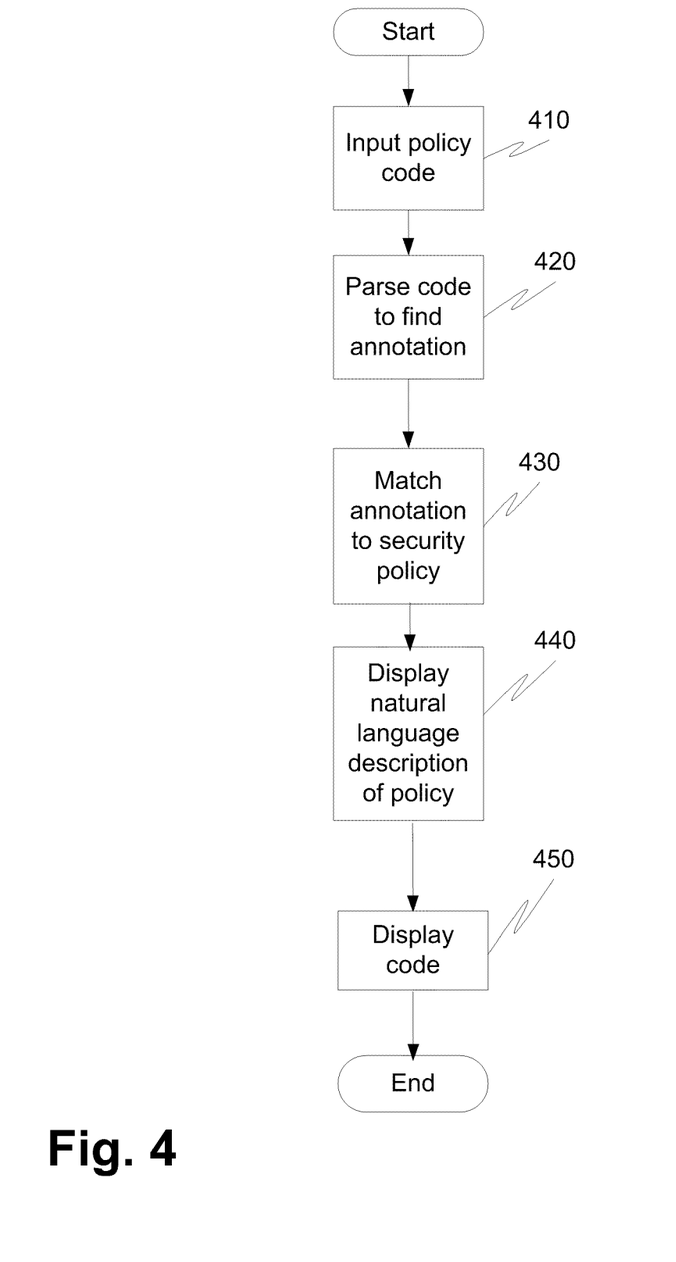
FIG. 4 is a flow diagram depicting a function of the security policy verification system in accordance with an embodiment.

FIG. 4 illustrates a flow diagram of the functionality of security policy verification module 120 in accordance with an embodiment. In one embodiment, the functionality of the flow diagram of FIG. 4 is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The system starts with the recording of security policies written in a natural language by security managers. Once written, the system generates a tag for use in annotating code that implements the security policy. After the security policy has been implemented, security policy verification module 120 receives as input the security policies and natural language description for the policies, along with the technical implementations of those policies (410). Parser 370 parses or inspects the code of the technical implementations to identify an annotation/tag in accordance with the reference implementation (420). Security policy verification module 120 then determines which security policy is being implemented based on the annotation, and associates that implementation of the security policy with the natural language description (430). When a developer includes this annotation in the code of the technical implementation, security policy verification module 120 recognizes the annotation and associates the corresponding natural language phrase. For example, if a technical implementation includes the annotation "PayablesViewInvoices," this annotation may correspond to the structured, natural language description of: "Payables Clerks should be able to see invoices processed through the business unit in which they work." Security policy verification module 120 then displays the structured, natural language descriptions of the security policies associated with a role to a user (440). The user may select to get additional details or "drill down" to a specific implementation, in which case security policy verification 120 displays a selected technical implementation to the user (450). This view would display the code that implements that particular implementation of the security policy. If a role is associated with a security policy for which no technical implementation was found, an indication of this is displayed in the user interface. For example, if none of the technical implementations in the repository contained the annotation code "PayablesViewInvoices," then the user interface would indicate that the corresponding security policy is not implemented.

Figure 5:
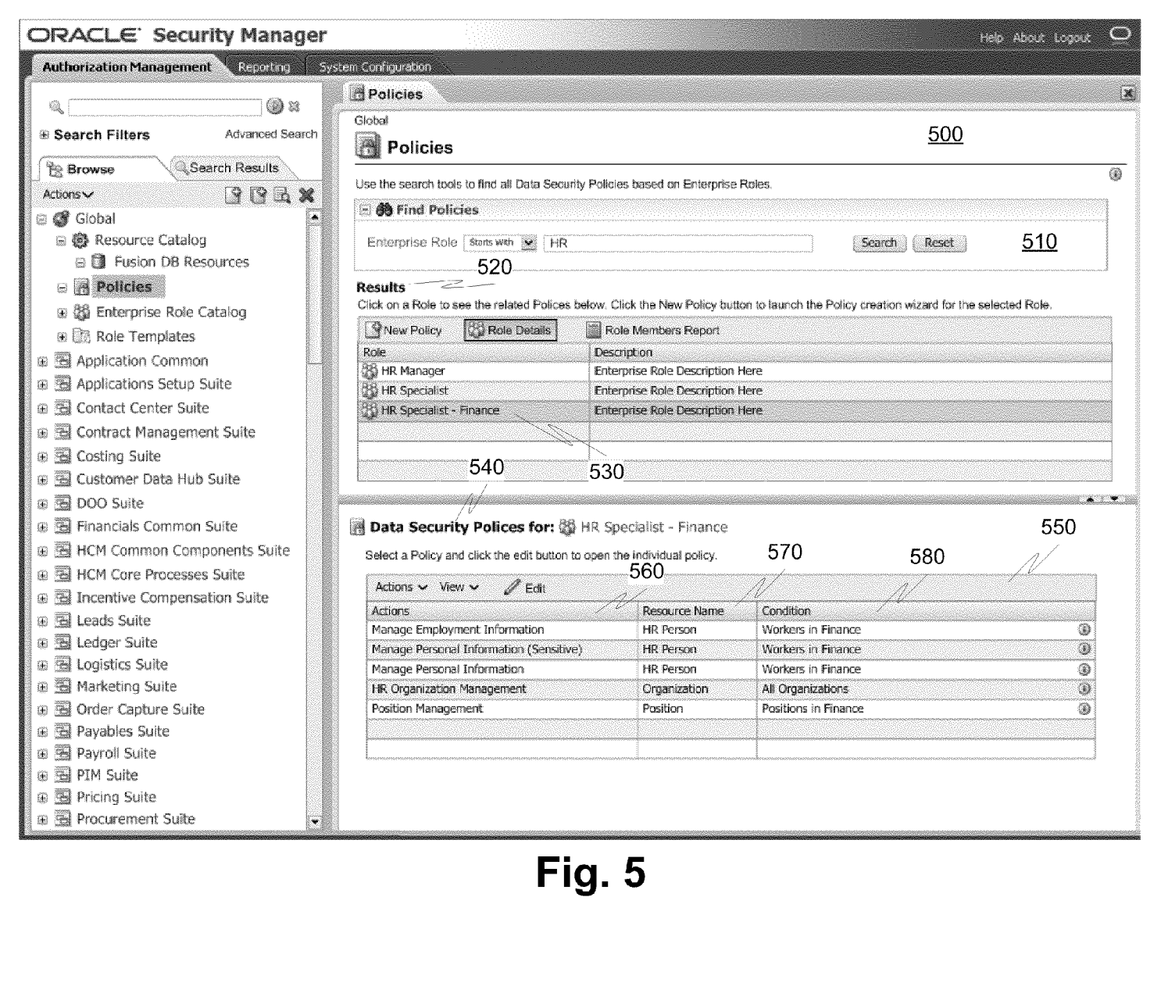
FIG. 5 is an example user interface for a security policy verification system in accordance with an embodiment.

FIG. 5 illustrates an example user interface 500 for security policy verification module 120. Find policies box 510 allows a user to search for security policies associated with a role. For example, entering "HR" produces search results in results box 520 that include the roles with "HR" in the role name. When the "HR Specialist—Finance" role 530 is selected, the associated security policies are displayed in data security policies box 540. Data security policies box 540 includes table 550 having an action column 560 giving a natural language description of data security policies, a resources name column 570 that names the resource to which the policy applies, and a condition column 580 showing the condition that must be satisfied for the policy to apply.

Table 1 below is an example table of policies of natural language descriptions of security policies based on a role. For example, for the role of "Accounts Payable Manager", the generated natural language description from detected annotation would be "Accounts Payable Manager can view customer account for all customer accounts in the enterprise". Under the "Implemented as" column, one or more implementations are specified. Although Table 1 only includes a single implementation, a variety of implementations could be specified, some automated and some executed by a person. For example, if the policy states that the chief accountant can authorize a check run, the implementation may be that the signature is required on the check register, counter signed by the accounts payable manager. Table 1 in one embodiment is shown to the user as a user interface.

TABLE 1

| Enterprise Role | Auxiliary Verb | Verb | Business Object | Attribute | Condition | Implemented as | Privilege | Application Role | Privilege Approval Status | For Object Approval Status | Approval Status |
| --- | --- | --- | --- | --- | --- | --- | --- | --- | --- | --- | --- |
| Accounts Payable Manager | can | View | Customer Account | Account Name | For all customer accounts in the enterprise | conditional grant | View Customer Account Name (Data) | Trading Community Internal Public Personally Identifiable Information Inquiry Du | APPROVED | Approved | Approved |
| Accounts Payable Specialist | can | View | Customer Account | Account Name | For all customer accounts in the enterprise | conditional grant | View Customer Account Name (Data) | Trading Community Internal Public Personally Identifiable Information Inquiry Du | APPROVED | Approved | Approved |
| Accounts Payable Manager | can | Access | Party Tax Profile | | For any Party Tax Profile defined in the | conditional grant | Manage Party Tax Profile (Data) | Tax Third-Party Inquiry Duty | APPROVED | Approved | Approved |

TABLE 1-continued

| Enterprise Role | Auxiliary Verb | Verb | Business Object | Attribute | Condition | Implemented as | Privilege | Application Role | Privilege Approval Status | For Object Approval Status | Approval Status |
|---|---|---|---|---|---|---|---|---|---|---|---|
| Accounts Payable Specialist | can | Access | Party Tax Profile | | enterprise For any Party Tax Profile defined in the enterprise | conditional grant | Manage Party Tax Profile (Data) | Tax Third-Party Inquiry Duty | APPROVED | Approved | Approved |

Table 2 below may also be provided to a user as a user interface and illustrates how policies are tested across tools and transformations. Table 2 shows the data security policy, the logical business object that it applies to, and a transformation of that business object.

TABLE 2

| Data Security Policy | Logical Business Object | Role | Privilege | Dimension | Transformation |
|---|---|---|---|---|---|
| An AP manager should be able to view supplier invoices for business units in which they are authorized | Supplier Invoices | AP Manager | View Supplier Invoices | Business Unit | None |
| An AP manager should be able to view supplier invoices for business units in which they are authorized | Supplier Invoices | AP Manager | View Supplier Invoices | Business Unit | Spend |

As disclosed, the security policy verification system in accordance with one embodiment includes a parser for parsing the code of technical security implementations and logic that identifies annotations in the code with natural language descriptions of a security policy. Accordingly, a security manager or policy auditor can easily view the security policies for a role and quickly determine whether or not those policies are sufficiently implemented, without having knowledge of the underlying implementation.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A non-transitory computer-readable medium having instructions stored thereon that, when executed by a processor, cause the processor to provide a security policy verification system, the providing comprising:
   receiving an implementation of a first security policy, wherein the received implementation is one of a plurality of implementations of the first security policy, each implementation is different from the other implementations in terms of being in a different computer language, a different platform, or a different framework, and the first security policy is one of a plurality of security policies;
   recognizing which implementation of the plurality of implementations of the first security policy was received, wherein the plurality of implementations are recognizable;
   parsing programming language code of the implementation of the first security policy;
   identifying a first annotation in the programming language code;
   matching the first annotation to the first security policy to which the first annotation corresponds; and
   displaying a natural language description of the first security policy in a user interface, wherein the natural language description of the first security policy describes at least one access privilege that is assigned to at least one role.

2. The computer-readable medium of claim 1, wherein the first security policy is associated with one or more roles.

3. The computer-readable medium of claim 1, wherein the first annotation is defined by a security policy reference implementation.

4. The computer-readable medium of claim 1, further comprising:
   displaying the programming language code at a request of a user.

5. The computer-readable medium of claim 1, further comprising:
   determining that a second security policy is not implemented; and
   displaying an indication in the user interface that the second security policy is not implemented for a first technology.

6. The computer-readable medium of claim 5, wherein determining that the second security policy is not implemented comprises:
   parsing a plurality of existing security policy implementations; and failing to identify a second annotation corresponding to the second security policy.

7. The computer-readable medium of claim 1, further comprising displaying in the user interface all implemented security policies for a role.

8. A computer-implemented method, performed by a processor, for providing a security policy verification system, comprising:
receiving an implementation of a first security policy, wherein the received implementation is one of a plurality of implementations of the first security policy, each implementation is different from the other implementations in terms of being in a different computer language, a different platform, or a different framework, and the first security policy is one of a plurality of security policies;
recognizing which implementation of the plurality of implementations of the first security policy was received, wherein the plurality of implementations are recognizable;
parsing programming language code of the implementation of the first security policy;
identifying, by the processor, a first annotation in the programming language code;
matching, by the processor, the first annotation to the first security policy to which the first annotation corresponds; and
displaying a natural language description of the first security policy in a user interface, wherein the natural language description of the first security policy describes at least one access privilege that is assigned to at least one role.

9. The method of claim 8, further comprising:
determining that a second security policy is not implemented; and
displaying an indication in the user interface that the second security policy is not implemented.

10. The method of claim 8, wherein determining that the second security policy is not implemented comprises:
parsing a plurality of existing security policy implementations; and
failing to identify a second annotation corresponding to the second security policy.

11. The method of claim 8, further comprising displaying in the user interface all implemented security policies for a role.

12. A security policy verification system, comprising:
a processor;
a memory storing instructions coupled to the processor;
a receiving module that receives an implementation of a first security policy, wherein the received implementation is one of a plurality of implementations of the first security policy, each implementation is different from the other implementations in terms of being in a different computer language, a different platform, or a different framework, and the first security policy is one of a plurality of security policies;
a recognizing module that recognizes which implementation of the plurality of implementations of the first security policy was received, wherein the plurality of implementations are recognizable;
a parser, executed by the processor, for parsing programming language code of the implementation of the first security policy and identifying a first annotation within the programming language code;
a security policy module, executed by the processor, that matches the first annotation to the first security policy to which the first annotation corresponds; and
a user interface that displays a natural language description of the first security policy implementation, wherein the natural language description of the first security policy describes at least one access privilege that is assigned to at least one role.

13. The security policy verification system of claim 12, further comprising:
a determining module that determines that a second security policy implementation is not implemented, and
wherein the user interface displays an indication that the second security policy implementation is not implemented.

14. The security policy verification system of claim 12, wherein determining that the second security policy implementation is not implemented comprises:
parsing a plurality of existing security policy implementations; and
failing to identify a second annotation code corresponding to the second security policy implementation.

15. The security policy verification system of claim 12, wherein the user interface displays all implemented security policy implementations for a role.

16. The computer-readable medium of claim 1, wherein the natural language description of the first security policy describes at least one access privilege that is assigned to at least one role of an employee of an enterprise.

17. The method of claim 8, wherein the natural language description of the first security policy describes at least one access privilege that is assigned to at least one role of an employee of an enterprise.

18. The security policy verification system of claim 12, wherein the natural language description of the first security policy describes at least one access privilege that is assigned to at least one role of an employee of an enterprise.

* * * * *

UNITED STATES PATENT AND TRADEMARK OFFICE
CERTIFICATE OF CORRECTION

PATENT NO. : 8,495,703 B2
APPLICATION NO. : 12/487361
DATED : July 23, 2013
INVENTOR(S) : King et al.

Page 1 of 1

It is certified that error appears in the above-identified patent and that said Letters Patent is hereby corrected as shown below:

In the Specification

In column 4, line 18, delete "polices" and insert -- policies --, therefor.

In column 5-6, in table 1, line 12, delete "Du" and insert -- Duty --, therefor.

In column 5-6, in table 1, line 20, delete "Du" and insert -- Duty --, therefor.

Signed and Sealed this
Twelfth Day of November, 2013

Teresa Stanek Rea
*Deputy Director of the United States Patent and Trademark Office*